Whitmarsh & Putnam,

Clothes Hook.

No. 2,744. Reissued Aug. 29, 1867.

Witnesses:

R. E. Tuckermann

N. W. Stearns

Inventors:

Henry M. Whitmarsh

Silas S. Putnam.

H. PETERS, PHOTO-LITHOGRAPHER, WASHINGTON, D. C.

United States Patent Office.

HENRY M. WHITMARSH, OF ABINGTON, AND SILAS S. PUTNAM, OF DORCHESTER, MASSACHUSETTS.

*Letters Patent No.* 61,590, *dated January* 29, 1867; *reissue No.* 2,744. *dated August* 20, 1867.

IMPROVED CLOTHES-HOOK.

The Schedule referred to in these Letters Patent and making part of the same.

TO ALL WHOM IT MAY CONCERN:

Be it known that we, HENRY M. WHITMARSH, of Abington, in the county of Plymouth, and State of Massachusetts, and SILAS S. PUTNAM, of Dorchester, in the county of Norfolk, and State aforesaid, have invented an Improved Hook for Suspending Clothes and other articles, of which the following is a full, clear, and exact description, reference being had to the accompanying drawings, making part of this specification, in which—

Our invention consists in an improved hook for suspending clothes and other articles, which is so constructed that it may be closed up out of the way, thereby causing it to occupy less space, and particularly adapting it for use in many situations where an ordinary hook would be unsuitable in consequence of its projecting out too far.

To enable others skilled in the art to understand and use our invention, we will proceed to describe the manner in which we have carried it out.

Figure 1:
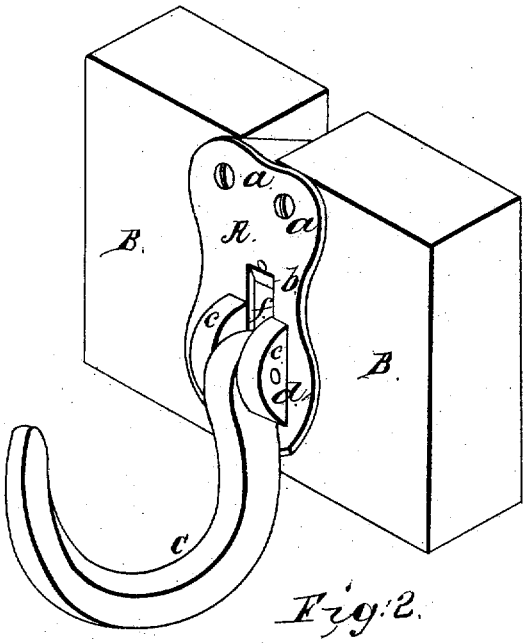
Figure 1 is a perspective view of our improved hook, open, ready for use.
Figure 2:
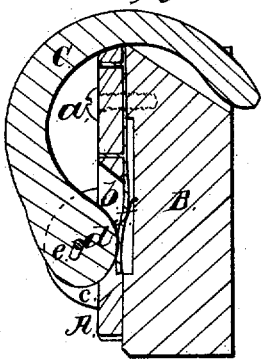
Figure 2 is a central vertical section through the same, closed up.

In the said drawings, A is a plate or bracket, which is attached to the strip B by screws *a*. Through this bracket A is cut a slot, *b*, on each side of which is formed a projection, *c*, between which is pivoted the hook C, the pin *d* passing through a slot or opening, *e*, in the hook. To the under side of the bracket A, beneath the slot *b*, is secured a flat spring, *f*, which prevents the hook when down from being easily thrown up in removing an article therefrom. When the hook is thrown over into the position seen in fig. 2, the slot or opening *e* allows it to drop down slightly, by which it is locked in place and prevented from being thrown down on pressure being applied near its base in a downward direction, while it may easily be turned over into a position ready for use by taking hold near its point. The spring *f* may be dispensed with if desired, although we prefer to use it, as shown and described, and the form and size of the slot or opening in the hook C may be varied without departing from the spirit of our invention.

A hook constructed as above described may be readily closed up so as to occupy very little space, thereby adapting it to many places where the ordinary hook would be objectionable on account of its projecting out too great a distance.

Our invention may also be applied to meat-hooks, "water-hooks," for harness-saddles, and those used for various other purposes.

*Claim.*

What we claim as our invention, and desire to secure by Letters Patent, is—

A pivoted hook, C, with its slot or opening *e* so arranged that it may be closed up, and thus occupy less space, substantially as described.

We also claim, in combination with the above, a plate or bracket, A, substantially as and for the purpose set forth.

H. M. WHITMARSH,
SILAS S. PUTNAM.

Witnesses:
N. W. STEARNS,
W. J. CAMBRIDGE.